United States Patent

Wambeke et al.

[11] Patent Number: 5,560,618
[45] Date of Patent: Oct. 1, 1996

[54] TECHNIQUE FOR SEALING

[75] Inventors: Alain Wambeke, Zoutleeuw; Dirk Roosen, Tienen; Luc Uytterhoeven, Kampenhout; Jean-Pierre Wandels, Lubbeek, all of Belgium; Winfried Bentz, Bruckmühl-Götting, Germany

[73] Assignee: N.V. Raychem S.A., Belgium

[21] Appl. No.: 190,064

[22] PCT Filed: Aug. 5, 1992

[86] PCT No.: PCT/GB92/01453

§ 371 Date: Jan. 28, 1994

§ 102(e) Date: Jan. 28, 1994

[87] PCT Pub. No.: WO93/03302

PCT Pub. Date: Feb. 18, 1993

[30] Foreign Application Priority Data

Aug. 9, 1991 [GB] United Kingdom ............... 9117309

[51] Int. Cl.$^6$ .................................................. F16J 15/46
[52] U.S. Cl. ................. 277/1; 156/291; 156/294; 174/92; 277/34
[58] Field of Search ................. 156/48, 49, 52, 156/291, 293, 294; 29/455.1; 138/108, 110, 156, 157, 158, 162, 165, 166, 167, 168; 174/77 R, 92, 93, 97; 285/133.1, 137.1, 915; 277/34, 34.3, 218, 221

[56] References Cited

U.S. PATENT DOCUMENTS

| | | | |
|---|---|---|---|
| 530,314 | 12/1994 | Williams | 138/158 |
| 3,339,011 | 8/1967 | Ewers, Jr. et al. | |
| 4,086,736 | 5/1978 | Landrigan | 52/221 |
| 4,087,190 | 5/1978 | Haeder | 174/92 |
| 4,114,974 | 9/1978 | Lawrence | 339/103 C |
| 4,194,750 | 3/1980 | Sovish et al. | 277/208 |
| 4,377,291 | 3/1983 | Albertini | 277/105 |
| 4,518,448 | 5/1985 | Henry et al. | 174/92 |
| 4,733,019 | 3/1988 | Pichler et al. | 174/93 |
| 4,790,544 | 12/1988 | Kemp | 277/34 |
| 4,795,509 | 1/1989 | De Bruycker | 156/52 |
| 4,839,472 | 6/1989 | Pichler | 174/93 |
| 5,111,001 | 5/1992 | Jervis | 174/92 |

FOREIGN PATENT DOCUMENTS

| | | | |
|---|---|---|---|
| 0152696A2 | 8/1985 | European Pat. Off. | F16L 7/00 |
| 0408967A2 | 1/1991 | European Pat. Off. | H02G 15/01 |
| 7508247 | 1/1976 | Netherlands | 174/92 |
| 1506748 | 4/1978 | United Kingdom . | |
| 2006890 | 5/1979 | United Kingdom | 277/34.3 |
| 2113019 | 7/1983 | United Kingdom | 174/92 |
| 2151723 | 7/1985 | United Kingdom | F16J 15/00 |
| WO/91/02917 | 3/1991 | WIPO | 285/97 |
| WO93/14547 | 7/1993 | WIPO | H02G 15/11 |

Primary Examiner—Steven D. Maki
Attorney, Agent, or Firm—Herbert G. Burkard; Sheri M. Novack

[57] ABSTRACT

A method of sealing a duct having a non-uniform cross-section which comprises:

(i) positioning within the duct a device for locating a sealing material at a localized portion of an inner surface of the duct, at the non-uniformity; and (ii) positioning within the duct a sealing member than can at least partially block a cross-section of the duct such that the sealing material forms a seal between a portion of the duct and a portion of the sealing member.

7 Claims, 6 Drawing Sheets

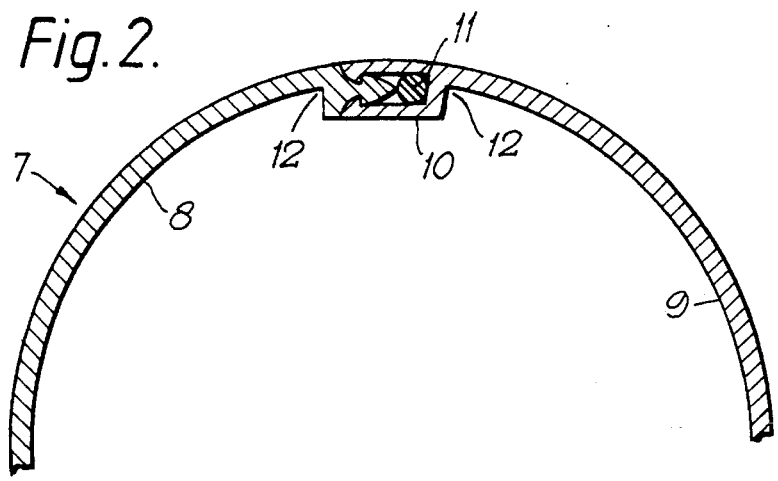
PRIOR ART
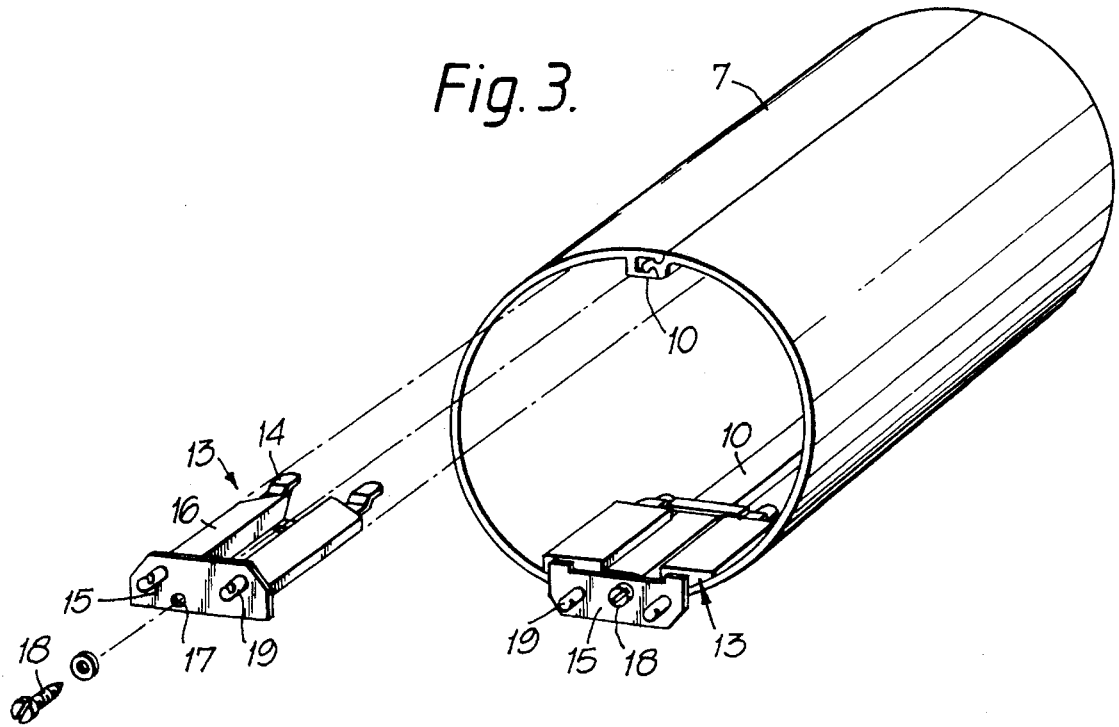

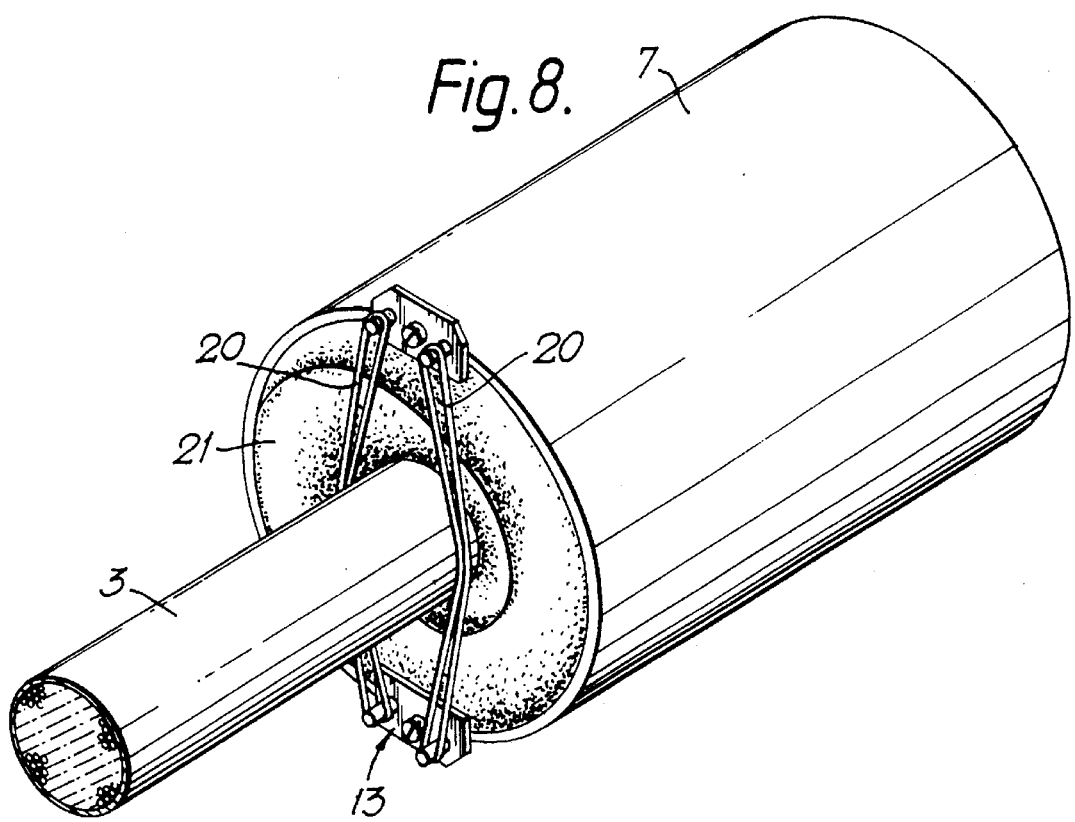
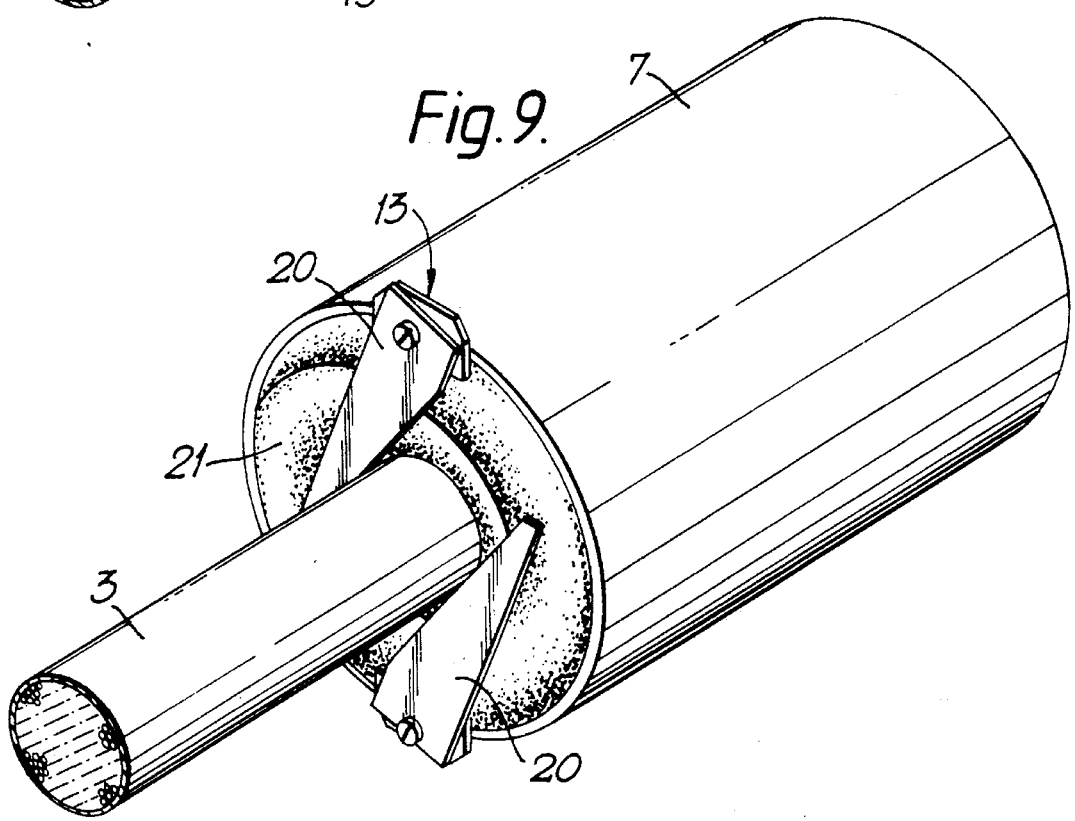

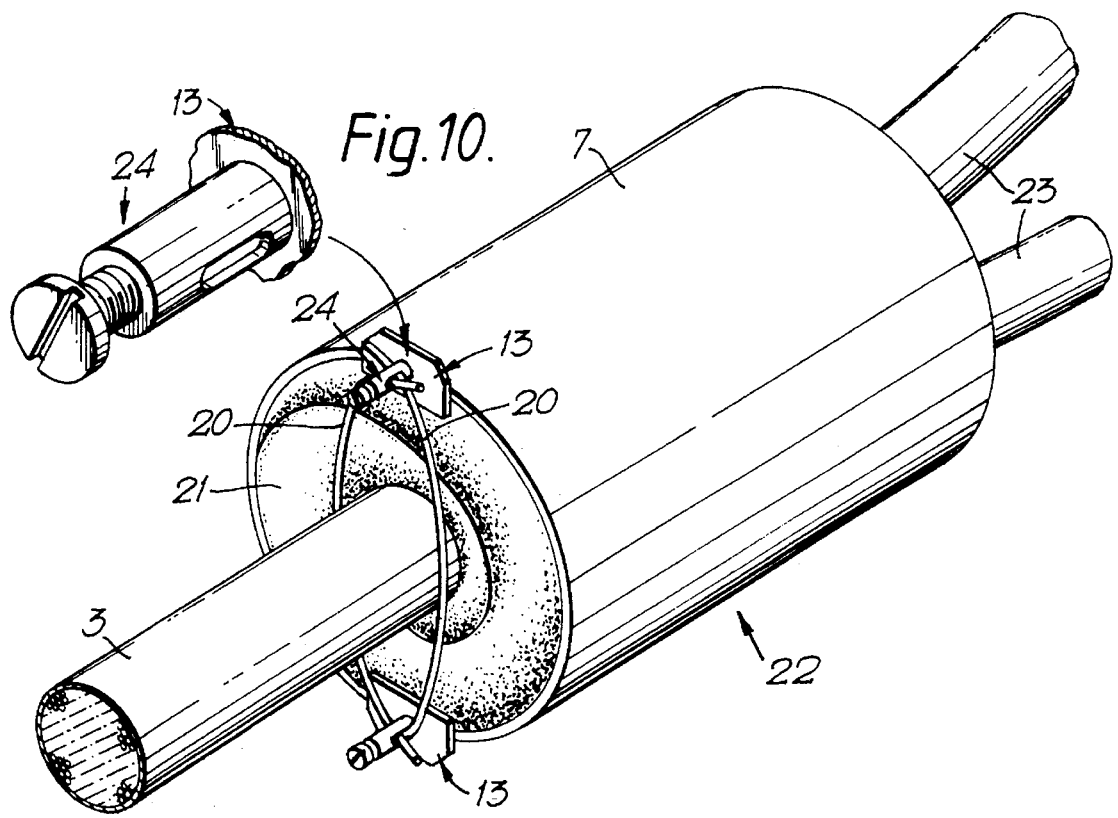

TECHNIQUE FOR SEALING

The present invention relates to the formation of a duct seal, either to seal around an article such as a supply line passing through it, or to block the duct completely. The term "duct" as used in this specification includes not only passages through walls or other bulkheads, but also articles such as cable enclosures, particularly cable splice cases. A cable splice case, for example, may comprise a generally tubular housing (the "duct") and seals at one or each end to the ingoing or outgoing cables.

Duct seals, as defined above, are required to isolate one part of (for example) a cable network from another. A cable may be installed underground in a duct that passes between manholes in which portions of the cable are spliced together. Since it is important to protect the splice from water and since it is necessary from time to time to have access to the splice, it is desirable to prevent the manhole from filling with water. Duct seals are therefore provided to seal the annular space between the duct and the cable it carries to prevent water flowing along the duct and into the manhole.

Another use for duct seals is to seal around a cable as it passes through the wall of a building or other bulkhead. Such seals are more usually referred to as "feedthroughs", but the term duct seal as used herein includes them.

Cable splice closures have the following form and function. A cable splice is made by removing cable jacket from the ends of the cables to be spliced, and then electrically connecting together the individual conductors of the cables. The cable splice, which in the case of telephone cables may contain many hundreds of connectors and be bulky, is surrounded by a so-called liner to provide mechanical protection. It is then necessary to provide environmental protection around the splice from intact cable jacket at one side of the splice to intact cable jacket at the other side of the splice. This can be done by providing a generally tubular housing around the splice and sealing the ends of the housing to the ingoing and outgoing cables. In this way, moisture and other contaminants are kept away from the conductors of the cables.

In each of these examples of duct seals, the problem is the formation of a good seal between the end of the duct and the cable (or, in the absence of a cable the formation of a complete block).

Some prior art duct seals may be briefly mentioned.

U.S. Pat. No. 4,194,750 (Sovish et al.) discloses a duct seal comprising a hollow body member having a plurality of spaced apart external deformable flanges and provided with a sealant on its external surface preferably between the flanges. The device may be used to seal a supply line within a duct by pushing it within the duct so that the flanges are deformed. The hollow body member may then be sealed to the supply line using, for example, a heat-shrinkable sleeve.

U.S. Pat. No. 3,339,011 (Ewers) discloses a pneumatically sealed cable enclosure comprising half-shells and inflatable seal means at each end of the half-shells.

EP-B-0152696 (Raychem) discloses an assembly for sealing a duct, comprising a flexible envelope that is arranged to be wrapped on itself for insertion into the duct, the envelope having an opening therein for receiving an expansible or expanding filler material. An adhesive or sealant is located on or associated with at least pan of the outer surface of the envelope. The envelope may be provided with an additional element, for example an external flap or extension, which extends from an edge of the envelope and which is provided on at least part of its surface with a sealant or adhesive. Alternatively; the sealant or adhesive may instead of being a direct coating on the surface of the envelope, be or be part of an additional element, for example an independent film, layer or self-supporting element positioned over the appropriate portions of the envelope, duct or cable.

In spite of the variety of designs of prior art duct seal, a problem remains with ducts having non-uniform cross-section. In particular, slit ducts may have internal, longitudinally-extending, protrusions by means of which they are secured in a tubular configuration. They may have two slits, generally 180° apart, and thus comprise two semi-cylindrical half-shells. These half-shells can snap together by means of respective male and female profiles, these profiles being formed in regions of extra wall thickness and thus constituting the longitudinally-extending protrusions referred to. Duct seals may therefore be formed in split form in order that they be of "wrap-around" design, which allows them to be installed around a cable etc. without access to a free end of the cable.

The problem arises because a sealing member within the duct cannot follow precisely the inner surface of the duct, due to the protrusion. Leak paths therefore result, along the duct between the duct and the internal sealing member, adjacent the protrusion.

We have attempted to solve this problem by coating the sealing member with a significant thickness of mastic or other sealing material, by applying separate wraps of sealing material, and by forcing mastic by hand adjacent the protrusions. None of these techniques is ideal.

Our solution to the problem is to provide a device that is separate from the sealing member and that locates a sealing material in desired positions.

Thus, the invention provides a method of sealing a duct having a non-uniform cross-section which comprises:
 (i) positioning within the duct a device for locating a sealing material, preferably as a strip, at a localized portion of an inner surface of the duct at the non-uniformity; and
 (ii) positioning within the duct a sealing member that can at least partially block a cross-section of the duct such that the sealing material forms a seal between a portion of the duct and a portion of the sealing member.

The invention also provides a kit of parts for forming a duct seal which comprises
 (a) a device that can be positioned within the duct for locating a sealing material at a localized portion of an inner surface of the duct; and
 (b) a sealing member that can at least partially block a cross-section of the duct such that the sealing material forms a seal between a portion of the duct and a portion of the sealing member.

Where a cable closure is to be provided, a kit may additionally comprise a duct, particularly a slit duct. The duct may be blind at one end, but in general it will comprise an open ended tube, and at least two sealing members plus devices will be supplied in order that each end be sealed.

The duct may pass through a wall, for example a wall of a manhole or a building, or through an internal bulkhead. Such a duct may be a mere hole through the wall, or it may comprise some tubular member that is in turn positioned in or built into a hole in the wall. Alternatively, the duct may comprise a portion of a cable closure, such as a central pan of a telecommunications or other cable splice case.

As mentioned above in discussion of the problem solved by the invention, the non-uniformity of the duct may comprise one or more internal longitudinally-extending protrusions by means of which half-shells etc are held together.

Opposing edges of respective half-shells may therefore snap together by means of respective male and female profiles.

The device preferably comprises:

(a) a first part that in use extends within the duct;

(b) a second part that in use abuts an end of the duct; and (c) the sealing material secured to the first part.

It may be in the form of a frame, for example having two legs which lie along respective sides of the protrusion of the duct. Each leg may carry a portion of the sealing material. Each leg may pass through a strip of sealing material whose cross-sectional shape corresponds to the cross-sectional shape to be filled. In general one side of the two strips together will have a shape substantially complementing to that of the protrusion and the other side of the strips will have a shape (generally a flat or gentle concave surface) that can be reliably sealed to by the sealing member. The correspondence in shape need not of course be exact since in general the sealing material will deform on installation.

The second pan of the device preferably extends at an angle, for example substantially perpendicularly, to the first part. In this way, the second part can be attached by means of a screw or other fixing means into an end of the duct. It will generally be convenient to insert the screw etc into the end of the protrusion since it will clearly be at the correct position, and its greater thickness (compared to the rest of the wall of the duct) will make attachment easier.

The first part is preferably from 50–200, particularly 80–150 mm long and 20–40 mm wide.

The device may have functions additional to that of locating the sealing material. For example, the second part, or another part, of it may retain the sealing member within the duct against internal pressure that would tend to displace it. The second part may achieve this by extending at least partly across the open end of the duct. In another embodiment, a further member may be provided that extends across the open end of the duct between, for example, two of the devices positioned about 180° apart around the circumference of the duct. Such further members may comprise elastomeric cords or rigid or resilient rods or plates etc.

The sealing member may comprise a flexible hollow sealing member (preferably having substantially non-stretchable walls) that can be inflated to seal a gap between first and second articles and that has a valve, preferably comprising:

a hole directly through a wall or between walls thereof through which hole a probe can be inserted (and from which it can preferably be removed by mere pulling) to introduce pressurizing medium into the member, and means by which the hole is automatically sealed on withdrawal of the probe.

The product may be supplied with the probe inserted through the hole. Furthermore, insertion of the probe may be part of the manufacturing process of the sealing member.

We have found that such hollow scaling members can be subjected to sever mechanical, temperature and pressure testing, and successful results obtained. The precise nature of the materials and the design of the sealing member can be chosen depending on intended use; the surprising result, however, is that a hole directly through a wall of the member, or between the walls of a lap join etc can automatically seal without the need for expensive valves and all the disadvantages they bring. It is believed that inflatable articles have never previously been used for environmental sealing (particularly in the cable accessories art) where life-times of many years are required without the need for periodic reinflation.

Whilst the exact design of the sealing system will be chosen according to the intended use of the product, We prefer designs incorporating one or both of the following features.

Firstly, an internal flap may be provided across the hole in or between the walls of the member. The flap may seal in response to pressure within the member. The flap preferably comprises a flexible polymeric sheet fixed to a wall of the member such that the probe can pass through the hole and displace the flap, the probe preferably passing between the flap and the wall substantially in the plane of the wall (say at less than 45° to that plane). A sealing material, for example a gel or a mastic, may be provided between the flap and the wall, for example as a coating on the flap. The flap may be bonded or welded to the wall along two lines separated by a small gap (say 5–20 mm), such that the probe can be inserted through the hole in the wall and between the wall and the flap-generally along the axis of the channel formed between the two bond or weld lines.

The second design is particularly appropriate where the hole is between overlapping walls of a lap join. (The lap join may arise in formation of the member by forming a tube from a sheet of material.) The hole, which extends the width of the lap join, may decrease in cross-sectional size toward the outside of the sealing member. The hole may therefore have a funnel, or flattened-funnel, shape. A sealing material (preferably a mastic or a gel) may be provided within this funnel-or-other-shaped hole, such that the sealing material is driven by internal pressure to block the hole. The size of the hole and the physical properties and amount of the sealing material may be chosen such that the material does not creep out of the hole to an unacceptable extent. A flap as mentioned above may be used in conjunction with this type of hole.

The sealing material may comprise for example a mastic or a gel. Mastics may be preferred due to their good adhesion to the wall of the sealing member. A seal can therefore remain even on loss of some or all of the internal pressure that forces the flap against the wall. Mastics however have high, generally 100%, compression set and where that is likely to be a problem the mastic may be replaced or supplemented by a gel. For example if the probe is likely to leave a channel in the mastic on withdrawal, a gel could be provided as a supplementary layer between the mastic and the wall, preferably of smaller surface area than (and therefore totally surrounded by) the mastic. A gel may be formed by oil-extension of a polymeric material. The polymeric material may be cross-linked. I prefer that the gel has a hardness at room temperature as determined using a Stevens-Volland Texture Analyser of greater than 45 g, particularly greater than 50 g especially greater than 60 g. It preferably has a stress-relaxation less than 12%, particularly less than 10% and especially less than 8%. Ultimate elongation, also at room temperature, is preferably greater than 60%, especially greater than 1000%, particularly greater than 1400%, as determined according to ASTM D638. Tensile modulus at 100% strain is preferably at least 1.8, more preferably at least 2.2 MPa. In general compression set will be less than 35%, especially less than 25%. Preferred gels are made by extending with an oil block copolymer having hard blocks and rubbery blocks. Examples include triblock copolymers of the styrene-ethylene-butylene-styrene type (such as those known by the Shell Trade Mark Kraton, eg G 1650, 1651 and 1652). The mount of block copolymer may be, say from 5–35% of the total weight of the gel, preferred amounts being 6–15%, especially 8–12%. The amount of copolymer, and its molecular weight may be varied to give the desired physical properties such as hardness.

The designs described above will find particular use for environmental protection of supply lines such as pipes and cables particularly telecommunications cables. In particular, they may be used for the formation of duct seals or splice cases.

In order to reduce any tendency for the sealing member to move in the duct, we prefer that the sealing member has:

a first surface that will contact for example a cable, and a second surface that will contact the duct, an average coefficient of friction of the first surface being less than that of the second surface such that the sealing member will not move with respect to the duct under a pressure difference across the member of 35KPa, and preferably also 70 KPa, whilst allowing movement of the cable relative to the sealing member.

In this way, we allow for movement of the cable (etc) relative to the duct, whilst maintaining the desired seal.

Coefficients of friction can be chosen by varying coatings and supplementary layers on the outer surfaces of the flexible member. For example, we prefer to provide a sealing material, such as a gel or a mastic, or a rubber or other elastomeric foam, on an external surface of the sealing member. Such a sealing material can seal voids between the sealing member and the duct, for example within creases formed in the sealing member when it is wrapped around a cable.

If a mastic is used, a release layer may be desirable in order that the duct seal be easily handled, in particular so that it can be readily inserted into the duct. A thin, flexible polymeric film may be provided on an outwardly-facing surface, for example over a mastic layer. Such a film can allow the mastic to deform to fill voids thereby eliminating leak paths, it can reduce tack facilitating installation, and can have a very high coefficient of friction, particularly to plastics materials such as polyvinyl chloride and polyethylene, typical materials from which cables and ducts are made. Preferred films comprise linear low density polyethylene, such as that known as "cling film". The surface of the sealing member that will face the duct may be covered with such a film to a greater extent (and optionally completely) providing greater friction to the duct than to the cable. The film may have apertures in it, allowing some direct contact between sealing material and first or second surfaces. The film may be provided between two layers of mastic or other sealing material to provide the combined laminate with strength. In that case, apertures in the film allow the two layers to bond to one another directly.

The invention is further illustrated with reference to the accompanying drawings, in which FIG. 1 shows a prior an duct seal;

FIG. 2 shows a prior an split duct;

FIG. 3 is a perspective view of installation of a device for locating a sealing material in a duct;

FIGS. 8 and 9 show duct seals formed using the device and an expanded envelope; and FIG. 10 shows a splice case formed using the device and an expanded envelope.

Figure 1:
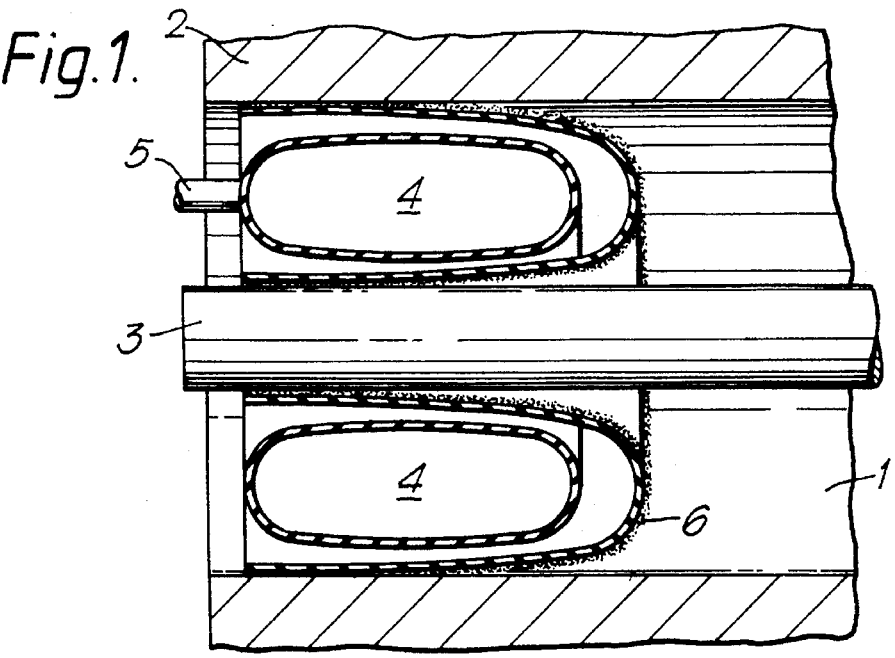
FIG. 1 shows a duet seal formed according to EP-B-0152696 (Raythem).

A duct 1 is formed directly in a wall 2 to allow passage of cable 3 through the wall. A duct seal 4 is shown partially blocking the annular gap between the cable and the duct.

The duct seal 4 comprises an expandable envelope, a filler material being introduced into the envelope through tube 5. It is shown partially expanded and when fully expanded it will prevent passage of water etc along the duct and through the wall. A separate sheet 6 is positioned around part of the surface of the duct seal 4. The sheet is coated on its outwardly-facing surfaces with a hot-melt adhesive, by means of which it will become bonded to the duct and cable on expansion of the duct seal 4.

The duct of FIG. 1 is a simple hole, circular in cross-section, and sealing by means of the envelope and sheet illustrated is reasonably straightforward.

A problem arises, however, with a slit duct 7 such as that shown in FIG. 2. This duct comprises half-shells 8, 9 joined together by interlocking male and female edge portions which together result in an internal longitudinally-extending protrusion 10. The duct is desirably sealed along its length, and this can be achieved by sealing the slit with an elastomeric or other rod 11 with the female edge portion. The longitudinally-extending protrusion 10 results in two recesses 12 that cannot be sealed merely by expanding within the duct an envelope such as that illustrated in FIG. 1. Furthermore, the sheet 6 of FIG. 1 does not solve the problem.

The present solution to the problem is illustrated in the remaining figures.

FIG. 3 shows a slit duct 7 and two devices 13 for locating a sealing material; one of the devices is shown in place in the duct; and the other is shown ready to be slid or otherwise placed in position. Each device 13 comprises a first pan 14 that in use extends within the duct, a second pan 15 that in use abuts an end of the duct, and a sealing material 16, preferably a mastic and preferably in strip form. The sealing material 16 is secured to the first part 14, preferably by being coated around it. In general, we prefer that the first part 14 comprises two elongate legs, each coated with sealing material, between which the longitudinally-extending protrusion 10 of the duct can pass. Thus, sealing material is located at each side of the protrusion.

The device 13 may have other features. For example, means 17 may be provided for attaching the second part 15 (or other part) of the device to the duct. Such means 17 may comprise a hole through which a screw 18 or other fixing member may pass. The screw 18 may pass into the protrusion 10. Extensions 19, or other means, may also be provided for securing a rod or cord ere between two devices 13 disposed say 180° apart around the duct. Such a rod or cord could then serve to provide mechanical constraint on a sealing member, such as an inflatable envelope, positioned within the duct.

Figure 4:
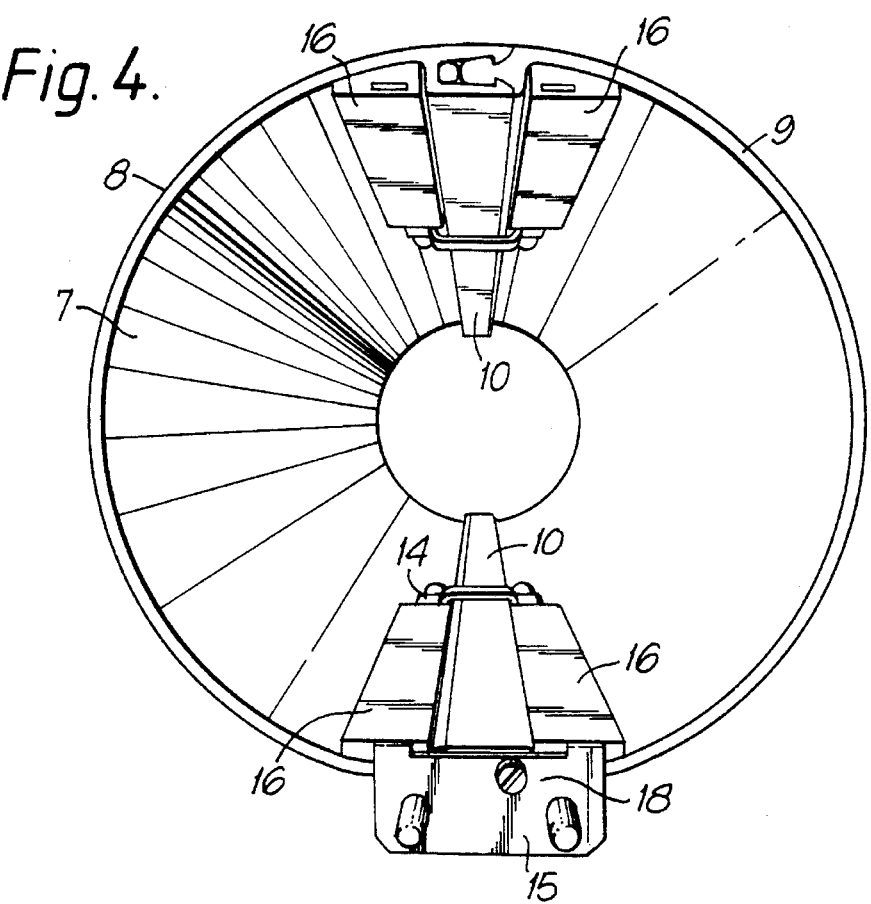
FIG. 4 is an end view of a duct with such devices installed.

An end view of a duct with two devices 13 in position is shown in FIG. 4.

Figure 5A:
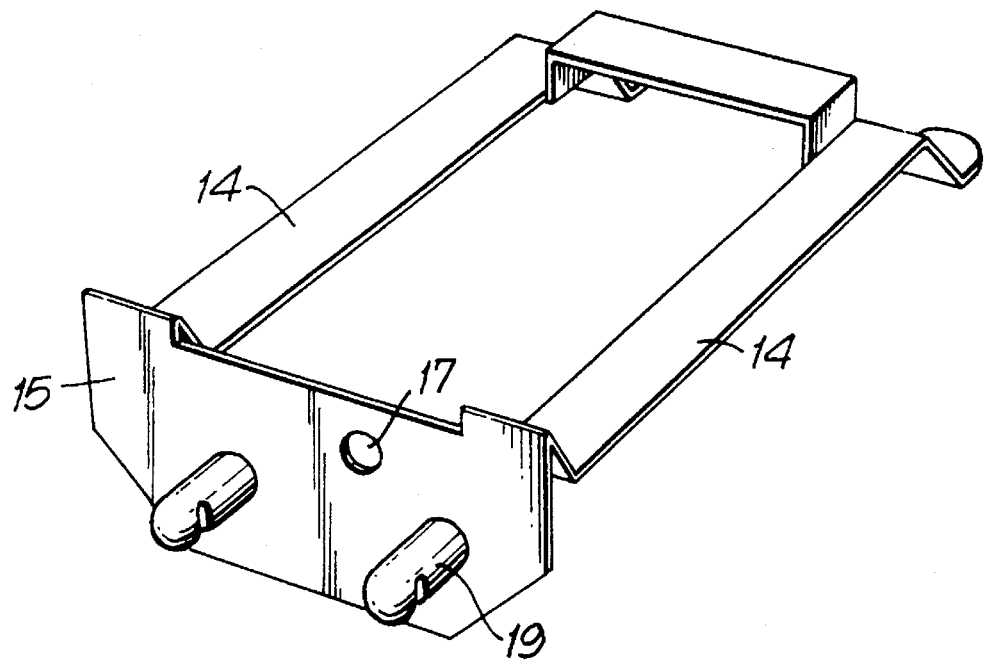
FIGS. 5, 6 and 7 show various devices.
Figure 5B:
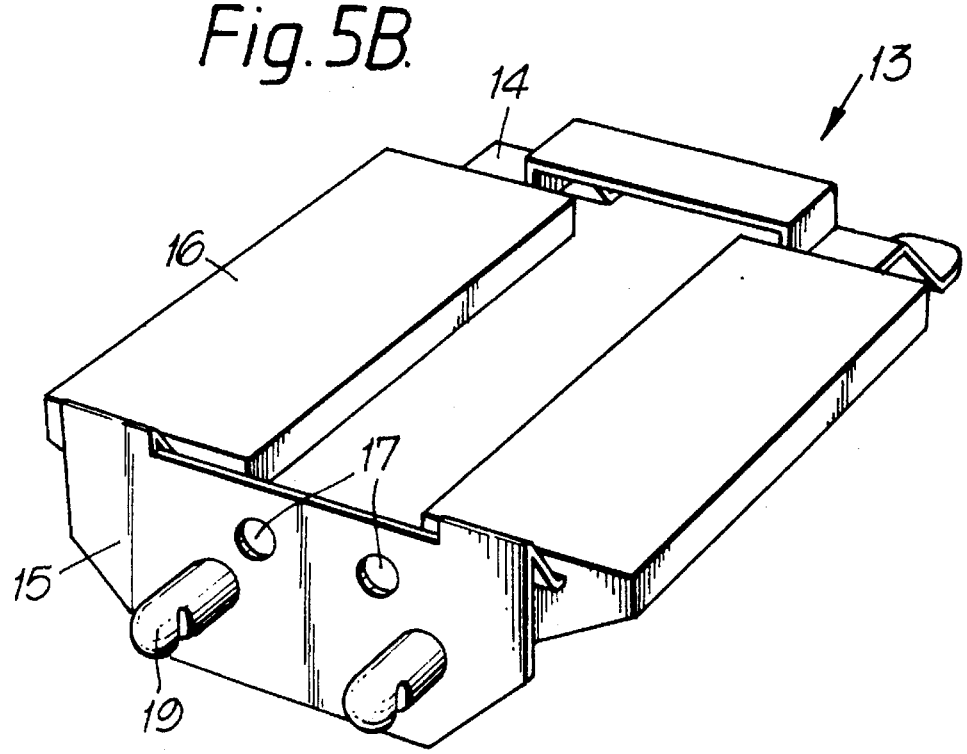

FIGS. 5A and 5B show a device 13 respectively without and with sealing material 16 positioned around the first part 14. The sealing material can be seen to have one side (lower side as drawn) whose shape corresponds to the recesses 12 (see FIG. 2) and an opposite side (top side as drawn) that is generally fiat and against which a sealing member can seal.

FIG. 5B shows a further feature, namely two means 17. This is useful if the position on the duct where a screw etc is to be inserted is off-set from the center of the device 13. With two such means 17 a single design of device can be used at either of the two positions shown in, for example, FIG. 4, and at either end of the duct.

Figure 6A:
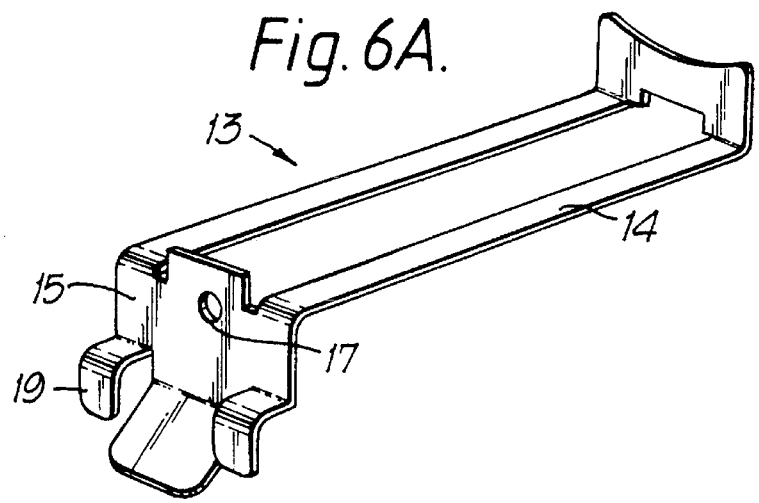

FIG. 6A shows in perspective view a device 13 having an angled end at the end remote from the second part 15. That angled end may serve to prevent excessive movement of a sealing member into a duct. Means 19 are merely stamped or otherwise formed from the material of the second part 15.

Figure 6B:
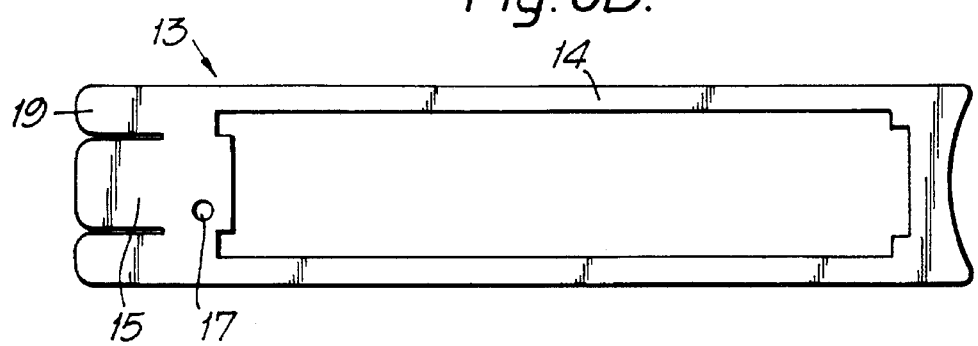

FIG. 6B shows a sheet of metal or other material before a forming operation that transforms it into the device of FIG. 6A.

Figure 7A:
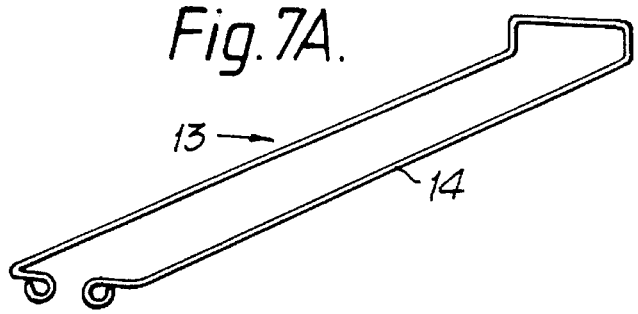
Figure 7B:
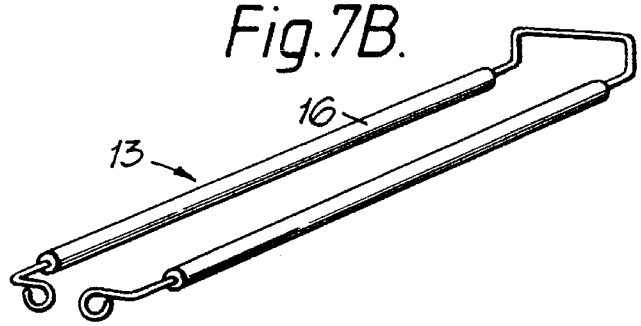

FIGS. 7A and 7B show a device 13 formed from wire or rod.

FIGS. 8 and 9 show duct seals formed by the invention, differing in the means 20 that is attached to the device 13 and that serves to restrain a sealing member 21 within the duct 7 against internal pressure. In FIG. 8 elastic cords 20 extend from one device 13 to the other, whereas in FIG. 9 each device 13 carries a plate or other member against which the sealing member 21 abuts.

The sealing members 21 shown comprise flexible, hollow inflatable envelopes that have been wrapped around cables 3 and then slide along the cables into ducts 7. When in position they are then inflated, preferably with air or other gas or non-setting fluid, to form the desired seal. They may be inflated using a probe that communicates with, or which incorporates, a valve. Preferably the valve is part of the envelope, allowing the probe to be removed after inflation.

A splice case 22 is shown in FIG. 10. Here a branched splice between one ingoing telecommunications cable 3 and two outgoing cables 23 is enclosed within a generally tubular closure 7. The closure 7 is split in order that it be installable around the splice without access to free ends of the cables. It is, therefore, a so-called "wrap around" design.

A sealing member, preferably comprising an inflatable envelope, is wrapped around the cable 3, and one or more second envelopes (hidden from view in the drawing) is wrapped around and between the branching cables 23.

The device 13 used in FIG. 10 differs from those shown in FIGS. 8 and 9 in that a different design of fixing 24 is used to secure the means 20, which here comprise resilient metal rods.

A wall of the sealing member will in general be preferably flexible, and thus able to conform to substrates of various sizes and/or of irregular or awkward shape. It may comprise at least three layers, for example one serving to retain the fluid, one to provide mechanical strength for example tensional strength against internal pressure, tear-strength or puncture resistance and one layer serving to form a seal to the substrate by accommodating small scale irregularities in the surface of the substrate. To this end the wall may comprise a first layer of metal (or metallized plastics material or metal-coated plastics material) optionally with which the fluid is in contact, and a second strengthening layer such as high density polyethylene, together with a third layer, in direct or indirect face-to-face relation with the first layer, and positioned between the first layer and the substrate. The third layer referred to above may comprise a deformable material such as a rubber or other elastomer or a foam.

The wall may comprise for example a laminate of a metal film and a layer of plastics material either side. Such plastics layers may allow the wall to be heat-welded to itself to make the envelope. A flap weld or bond, which will be under shear rather than peel when the article is inflated, preferably extends along the length of the sealing member where the sealing member is generally cylindrical. Simple welds that will be in peel may then be formed by hot stamping to close its ends.

Additional layers may be provided for mechanical strength such as oriented, for example biaxially-oriented or two layers of unixially oriented, high density polyethylene such as that known by the trade mark Valeron. A possible structure is as follows; the dimensions being merely preferred.

| | | |
|---|---|---|
| Copolymer | 15–30 | microns. |
| Valeron (trade mark) | 40–160 | microns |
| Mylar (trade mark) | 10–30 | microns |
| Aluminium (as one or more layers) | 5–60 | microns |
| Mylar (trade mark) | 10–30 | microns |
| Linear low density Polyethylene | 0–80 | microns |
| Copolymer | 15–30 | microns |
| An alternative structure comprises | | |
| Rayofix T (trade mark) | 75–125 | microns |
| Polyester "O" (such as Mylar) | 75–125 | microns |
| Aluminium | 8–16 | microns |
| Polyester "O" (such as Mylar) | 75–125 | microns |
| Rayofix T | 75–125 | microns |

"Rayofix" material is a tripolymer comprising ethylene butylacrylate, acrylic acid and ethylene groups.

We claim:

1. A method of sealing a duct having a non-uniform cross-section, which comprises:
    (i) providing a device in the form of a frame, which comprises:
        (a) a first frame part;
        (b) a second frame part; and
        (c) sealing material, which sealing material is secured to the first frame part, the first frame part comprising two legs, each leg carrying a portion of the sealing material;
    (ii) positioning the device within the duct such that the first frame part is located within the duct, the second frame part abuts an end of the duct, and the sealing material is located at a localized portion of an inner surface of the duct, which localized portion is a non-uniformity of the duct which comprises an internal longitudinally-extending protrusion, the device being positioned within the duct such that one leg is on one side of the protrusion and the other leg is on the other side of the protrusion;
    (iii) providing a sealing member, which sealing member is flexible, hollow and inflatable; and
    (iv) positioning the sealing member within the duct and inflating the sealing member such that the sealing material forms a seal between the localized portion of the duct and a portion of the sealing member.

2. A method according to claim 1, in which the duct passes through a wall.

3. A method according to claim 1, further comprising providing a cable in the duct wherein the sealing member is inflated to seal the annular space between the duct and the cable.

4. A method according to claim 1, in which the duct is a split duct.

5. A method according to claim 1, in which the duct is a split duct including duct parts and in which the longitudinally-extending protrusion comprises mutually-engaging edge portions of the duct parts.

6. A method according to claim 1, in which the device includes means to retain the sealing member within the duct.

7. A method according to claim 1, in which, when the device is positioned within the duct, the second frame part is attached to said end of the duct.

* * * * *

UNITED STATES PATENT AND TRADEMARK OFFICE
CERTIFICATE OF CORRECTION

PATENT NO. : 5,560,618
DATED : October 1, 1996
INVENTOR(S) : Wambeke et al.

It is certified that error appears in the above-identified patent and that said Letters Patent is hereby corrected as shown below:

Column 1, line 45, replace "an" by --art--.
Column 1, line 62, replace "pan" by --part--.
Column 2, line 49, replace "duet" by --duct--.
Column 2, line 50, replace "duet" by --duct--.
Column 2, line 62, replace "pan" by --part--.
Column 2, line 67, replace "etc" by --etc.--.
Column 3, line 19, replace "pan" by --part--.
Column 3, line 23, replace "etc" by --etc.--.
Column 3, line 54, replace "sever" by --severe--.
Column 3, line 59, replace "etc" by --etc.--.
Column 3, line 67, replace "We" by --we--.
Column 4, line 16, replace "flap-generally" by --flap generally--.
Column 4, line 62, replace "mount" by --amount--.
Column 5, line 13, replace "35KPa," by --35 KPa,--.
Column 5, line 16, replace "(etc)" by --(etc.)--.
Column 5, line 50, replace "an" by --art--.
Column 5, line 51, replace "an" by --art--.

UNITED STATES PATENT AND TRADEMARK OFFICE
CERTIFICATE OF CORRECTION

PATENT NO. : 5,560,618
DATED : October 1, 1996
INVENTOR(S) : Wambeke et al.

It is certified that error appears in the above-identified patent and that said Letters Patent is hereby corrected as shown below:

Column 5, line 61, replaced "duet" by --duct--.
Column 6, line 2, replace "etc" by --etc.--.
Column 6, line 28, replace "pan" by --part--.
Column 6, line 29, replace "pan" by --part--.
Column 6, line 44, replace "ere" by --etc.--.
Column 6, line 56, replace "fiat" by --flat--.
Column 6, line 58, replace "etc" by --etc.--.
Column 8, line 15, replace "tripolymer" by --terpolymer--.

Signed and Sealed this

Sixteenth Day of December, 1997

*Attest:*

BRUCE LEHMAN

*Attesting Officer*     Commissioner of Patents and Trademarks